US010397810B2

(12) United States Patent
Yang et al.

(10) Patent No.: US 10,397,810 B2
(45) Date of Patent: Aug. 27, 2019

(54) FINGERPRINTING ROOT CAUSE ANALYSIS IN CELLULAR SYSTEMS

(71) Applicant: Futurewei Technologies, Inc., Plano, TX (US)

(72) Inventors: Kai Yang, Bridgewater, NJ (US); Yanjia Sun, Downingtown, PA (US); Ruilin Liu, Hillsborough, NJ (US); Jin Yang, Bridgewater, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 94 days.

(21) Appl. No.: 14/991,598

(22) Filed: Jan. 8, 2016

(65) Prior Publication Data
US 2017/0201897 A1    Jul. 13, 2017

(51) Int. Cl.
*H04W 24/04*  (2009.01)
*H04W 24/06*  (2009.01)
(Continued)

(52) U.S. Cl.
CPC ............ *H04W 24/06* (2013.01); *H04L 43/16* (2013.01); *H04W 24/04* (2013.01); *H04W 24/08* (2013.01)

(58) Field of Classification Search
CPC ........ H04W 24/06; H04W 24/08; H04L 43/16
(Continued)

(56) References Cited

U.S. PATENT DOCUMENTS

| 7,480,640 B1* | 1/2009 | Elad ............... G06Q 10/10 706/14 |
| 7,483,934 B1* | 1/2009 | Ide ................. G06K 9/00979 708/422 |

(Continued)

FOREIGN PATENT DOCUMENTS

| CN | 104396188 A | 3/2015 |
| EP | 2894813 A1  | 7/2015 |

(Continued)

OTHER PUBLICATIONS

Joachim Pomy, "Mobile QoS Framework: Counters, KPI, KQI", ITU Workshop on "Workshop on Practical measurement of QoS/QoE Parameters for Regulatory Compliance", Cotonou, Benin, Jul. 16-17, 2012.

(Continued)

*Primary Examiner* — Un C Cho
*Assistant Examiner* — Lalita W Pace
(74) *Attorney, Agent, or Firm* — Vierra Magen Marcus LLP

(57) ABSTRACT

A processor implemented method of identifying a root cause of degraded network quality in a wireless network. The method includes accessing historical network performance data, the performance data including a time sequenced measure of performance indicators for the network. The method evaluates the historical performance data to determine regularly occurring associations between indicators to define a set of rules characterizing the associations of the wireless network, and stores the set of rules in a data
(Continued)

structure. The wireless network is monitored by accessing analysis data reporting time sequenced performance indicator data. Next, anomalies are detected in a performance indicator in the analysis data and matched to at least one rule in the set of rules. The method outputs an indication of a cause of degradation in the wireless network resulting from the anomaly in the performance indicator.

17 Claims, 5 Drawing Sheets

(51) Int. Cl.
    *H04W 24/08*      (2009.01)
    *H04L 12/26*      (2006.01)

(58) Field of Classification Search
    USPC .......................................................... 370/242
    See application file for complete search history.

(56) References Cited

U.S. PATENT DOCUMENTS

| | | | | |
|---|---|---|---|---|
| 8,135,990 B2* | 3/2012 | Vankov | ............... | H04L 41/0681 714/33 |
| 9,026,851 B2 | 5/2015 | Mondal et al. | | |
| 2007/0027985 A1* | 2/2007 | Ramany | ............. | H04L 67/1097 709/224 |
| 2010/0123575 A1* | 5/2010 | Mittal | ................ | H04L 41/0609 340/540 |
| 2013/0173565 A1* | 7/2013 | Meidan | .................. | G06Q 10/10 707/694 |
| 2013/0262656 A1 | 10/2013 | Cao et al. | | |
| 2014/0068348 A1* | 3/2014 | Mondal | ................... | H04L 41/16 714/45 |
| 2014/0122386 A1 | 5/2014 | Nahum et al. | | |
| 2015/0148040 A1 | 5/2015 | Ehrlich et al. | | |
| 2015/0333998 A1 | 11/2015 | Gopalakrishnan et al. | | |
| 2016/0162346 A1* | 6/2016 | Kushnir | ................ | G06F 11/079 714/37 |
| 2016/0350173 A1* | 12/2016 | Ahad | .................. | G06F 11/3495 |

FOREIGN PATENT DOCUMENTS

| | | |
|---|---|---|
| WO | 2008129243 A2 | 10/2008 |
| WO | 2014146690 A1 | 9/2014 |
| WO | PCT/CN2017/070156 | 3/2017 |

OTHER PUBLICATIONS

Suman et al., "A Frequent Pattern Mining Algorithm Based on FP-Tree Structure Andapriori Algorithm", Research and Applications (IJERA) ISSN: 2248-9622, vol. 2, Issue 1, Jan.-Feb. 2012, pp. 114-116.
Wu et al., "An Efficient Frequent Patterns Mining Algorithm Based on Apriori Algorithm and the FP-tree Structure", Third 2008 International Conference on Convergence and Hybrid Information Technology, Nov. 2008.
Bertino et al., "Profiling Database Applications to Detect SQL Injection Attacks", IEEE, Apr. 2007, pp. 449-458.
XP031896819 Szabolcs Novaczki et al., "Radio Channel Degradation Detection and Diagnosis Based on Statistical Analysis",2011 IEEE,total 2 pages.
European Search Report dated Oct. 30, 2018 in European Application No. 17735818.1, 14 pages.

\* cited by examiner

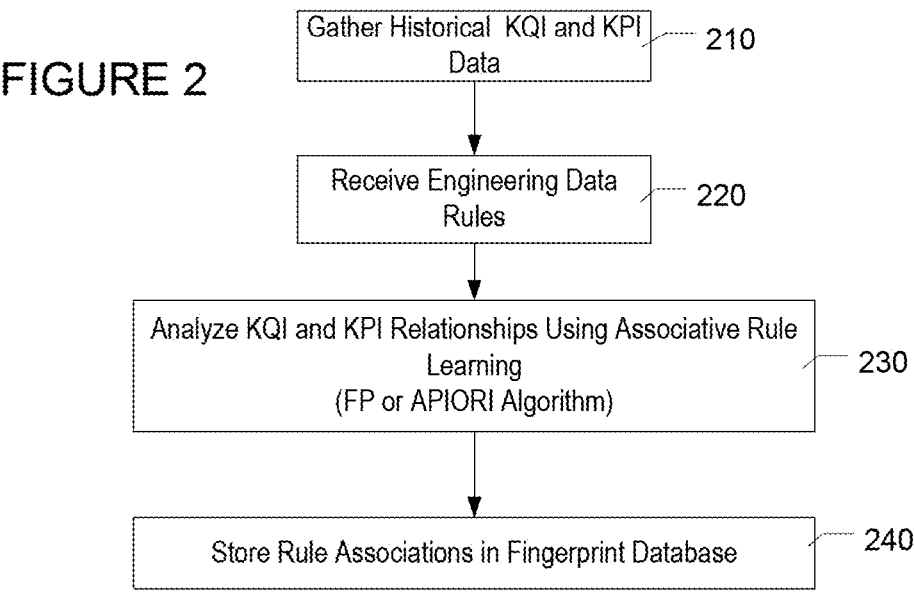
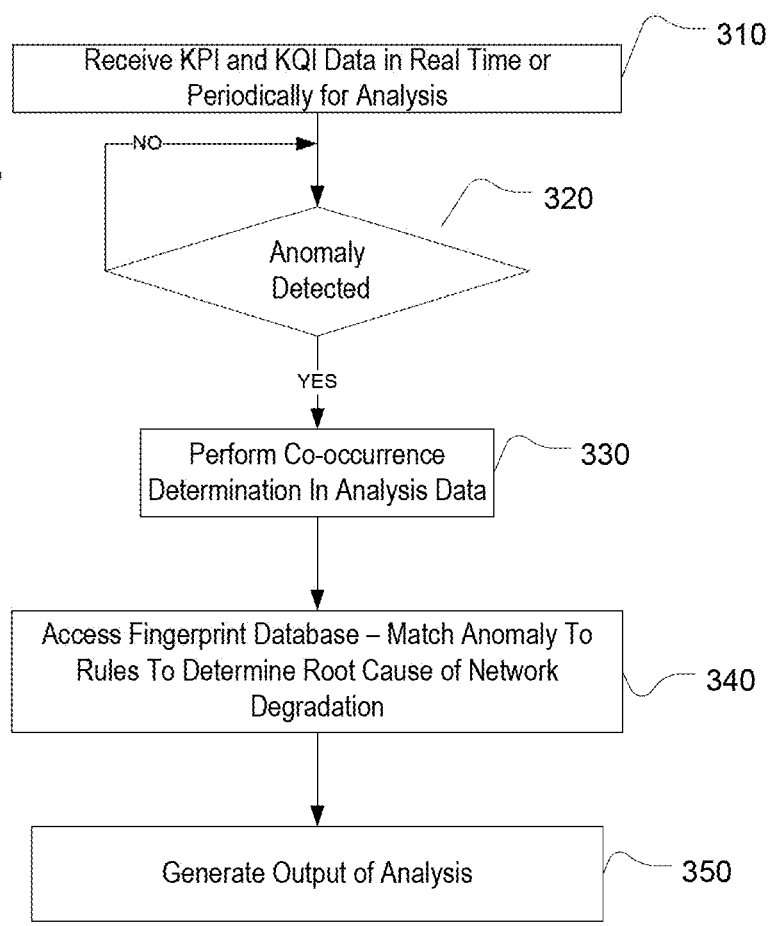

FINGERPRINTING ROOT CAUSE ANALYSIS IN CELLULAR SYSTEMS

BACKGROUND

The performance of a cellular network is affected by a collection of factors such as the data and voice traffic load, the RF coverage, the level of inter-cell interference, the location of users, and hardware failures. In many cases, the performance of a few wireless cells within a cellular network may appear abnormal, and mobile users that are served by these cells will suffer from poor user experience. A poor user experience will give rise to customer dissatisfaction. As a remedy, operators often need to detect the abnormal behaviors and then take actions to fix the problems. Traditionally, operators rely on network experts to analyze the behavior of a particular cell to identify the root causes. Traditional approaches of root cause analysis for wireless cellular networks are generally based on a correlation study or rely heavily on engineering knowledge. Such approaches are often heuristic in nature and it is in general difficult to quantify its accuracy. These approaches are also very time-consuming. It may take a few hours if not days to identify the root causes for the performance degradation.

SUMMARY

One aspect comprises a processor implemented method of identifying a root cause of degraded network quality in a wireless network. The method includes accessing historical network performance data, the performance data including a time sequenced measure of performance indicators for the network. The method further includes evaluating the historical performance data to determine regularly occurring associations between indicators to define a set of rules characterizing the associations of the wireless network, and storing the set of rules in a data structure. Subsequent to the evaluating, the method comprises monitoring the wireless network by accessing analysis data reporting time sequenced performance indicator data. Next, the method includes detecting an anomaly in a performance indicator in the analysis data and the anomaly is matched to at least one rule in the set of rules. The method provides for outputting an indication of a cause of degradation in the wireless network resulting from the anomaly in the performance indicator.

One general aspect includes a non-transitory computer-readable medium storing computer instructions, that when executed by one or more processors, cause the one or more processors to perform the steps of: computing a set of rules characterizing associations between performance indicators of elements of the wireless network based on one or both of engineering data and historical network data, the associations reflecting a set of elements having an effect on at least one other element of the wireless network; monitoring the wireless network by accessing analysis data reporting time sequenced performance indicator data; detecting an anomaly in at least one performance indicator in the analysis data; detecting co-occurring anomalies to said anomaly; matching the anomaly and co-occurring anomalies detected to at least one rule in the set of rules; and outputting an indication of a cause of degradation in the wireless network resulting from the anomaly in the performance indicator.

In another aspect, a mobile network monitoring system for a cellular network is provided. The system includes a processing system including at least a one processor, storage coupled to the processor, and a network interface. Instructions are stored on the storage operable to instruct the at least one processor to access historical network performance data, the performance data including a time sequenced measure of performance indicators for the cellular network. The instructions are operable to instruct the at least one processor to compute a set of rules characterizing regularly occurring associations between a group of performance indicators, each rule based on one or both of engineering knowledge data and the historical performance data, each rule defining for the group of indicators a set of indicators whose performance affects a one indicator in the group and store the set of rules in the storage. The instructions are operable to instruct the at least one processor to monitor the cellular network by accessing time sequenced analysis data of network performance indicators via the network interface. The instructions are operable to instruct the at least one processor to detect an anomaly in at least one performance indicator in the analysis data received via the network interface, and detect other anomalies co-occurring in time with said anomaly. The instructions are operable to instruct the at least one processor to match the anomaly and anomalies co-occurring in time to at least one rule in the set of rules, and output an indication of a cause of degradation in the cellular network resulting from the anomaly in the performance indicator.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2 is a flowchart illustrating a method for creating a fingerprint database in accordance with the system and method.

FIG. 3 is a flowchart illustrating a method for analyzing a network utilizing the fingerprint database.

DETAILED DESCRIPTION

A system and method are disclosed to allow discovery of root causes of network quality issues. In one embodiment, the system and method use association rule learning to create a fingerprint database for root cause analysis of the degraded user experiences with cellular wireless networks. A fingerprint database is built using historical performance data comprising engineering knowledge and/or data mining of patterns from historic network data. Once the fingerprint database is built, the system and method can monitor for anomalies in analysis performance data comprising key performance indicators (KPIs) and key quality indicators (KQIs) of the network. If an anomaly is detected, a co-occurrence analysis is used to identify abnormal patterns in other key quality and performance indicators that happen simultaneously. The determined co-occurring anomalies in indicators are then matched to the fingerprint database and find the associated potential root causes of the quality issue. The matching can be performed via comparing the identified abnormal patterns with the records in the historic knowledge database using a similarity measure.

The analysis system and method may be implemented as part of a network management system which allows engineers to adjust parameters of a network based on the output provided by the system. It should be understood that the present system and method may be embodied in many different forms and should not be construed as being limited to the embodiments set forth herein. Rather, these embodiments are provided so that this disclosure will be thorough and complete and will fully convey the system and method to those skilled in the art. Indeed, the system and method is intended to cover alternatives, modifications and equivalents of these embodiments, which are included within the scope and spirit of the system and method as defined by the appended claims. Furthermore, in the following detailed description, numerous specific details are set forth in order to provide a thorough understanding of the system and method. However, it will be clear to those of ordinary skill in the art that the present system and method may be practiced without such specific details.

Figure 1:
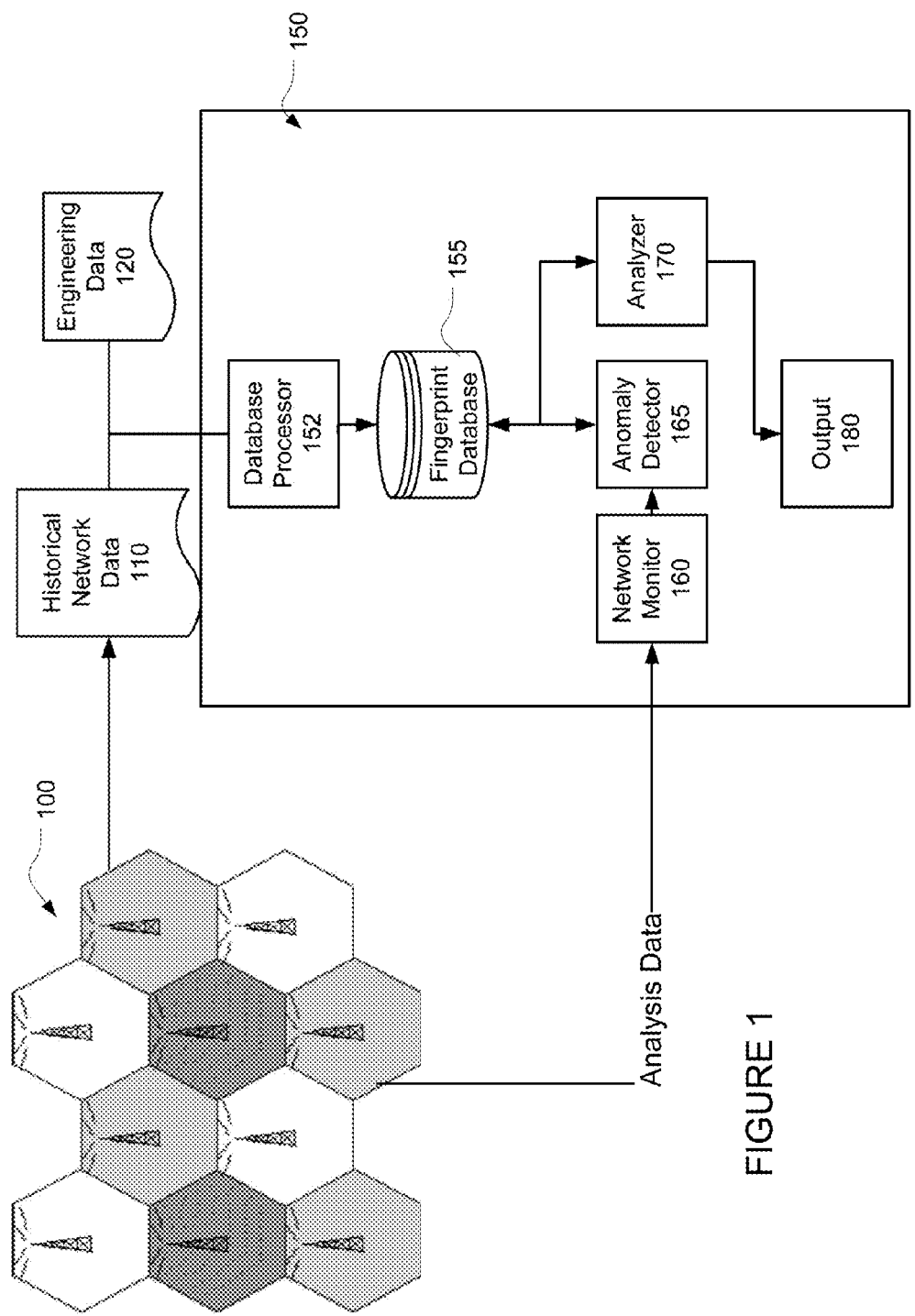
FIG. 1 depicts functional and structural components an exemplary system in which the present system and method may be implemented.

FIG. 1 depicts functional and structural components of an embodiment of the system which performs root cause analysis. FIG. 1 includes a network 100 which is the subject network to be monitored using the system. Although only one network is illustrated, multiple networks may be monitored, each having their own fingerprint database constructed based on such network's historical network data and engineering data.

The network 100 may comprise any wired or wireless network that provides communication connectivity for devices. The network 100 may include various cellular network and packet data network components such as a base transceiver station (BTS), a node-B, a base station controller (BSC), a radio network controller (RNC), a service GPRS support node (SGSN), a gateway GPRS support node (GGSN), a WAP gateway, mobile switching center (MSC), short message service centers (SMSC), a home location registers (HLR), a visitor location registers (VLR), an Internet protocol multimedia subsystem (IMS), and/or the like. The network 100 may employ any of the known and available communication protocols, such as Code Division Multiple Access (CDMA), Global System for Mobile communications (GSM), Universal Mobile Telecommunications System (UMTS), Long Term Evolution (LTE), or any other network protocol that facilitates communication between communication network 100 and a network enabled devices. The communication network 100 may also be compatible with future mobile communication standards including, but not limited to, LTE-Advanced and WIMAX-Advanced. The network 100 may include other types of devices and nodes for receiving and transmitting voice, data, and combination information to and from radio transceivers, networks, the Internet, and other content delivery networks. The network may support communication from any portable or non-portable communication device having network connectivity function, such as a cellular telephone, a computer, a tablet, and the like, can operatively connect to the communication network 100.

Key Quality Indicators (KQIs) are generally external indicators that serve as the basis for Quality of Service (QoS) assessment as perceived by the user. Some KQI's are quantifiable and reportable via the network (including the examples provided herein), while others may not be reportable by the network itself, but are nevertheless perceived by a user. Key Performance Indicators (KPIs) are internal indicators based on time-referenced network counters. Such KPIs are evaluated in the context of other counters and related to KQIs. Each KPI and KQI is a time-referenced measure of the particular indictor. Variations in each KPI and KQI can be tracked to a particular time indication. Network KPI's may be measured and monitored using defined standard interfaces in the wireless network. These KPIs include multiple network performance counters and timers. For example, in a mobile data service network, the service accessibility may be determined through the Packet Data Protocol (PDP) Context Activation Success Rate KPI, which may be an aggregated ratio of the successful PDP context activations to PDP context attempts. This KPI indicates the ability of the mobile subscriber to access the packet switched service.

In, for example, a web browsing session, a customer utilizing a mobile device that communicates with a web server via a communication network 100 will have a perceived performance experience. Such a network may include a large number of physical sub-systems, and network components, making problem identification, analysis or resolution difficult tasks. In the context of the web browsing session, in one example a customer may experience an average download throughput rate of 1 Mbps during a time where a peak number of customer service sessions are being handled by the network, and a throughput rate of 2 Mbps otherwise. In a scenario where the download throughput rate for a customer service session deviates significantly from these learned trends, a root cause analysis can be identified using the analysis system herein. One KQI discussed herein is the HTTP Large Page Display rate as measured in kbps which is a metric of a web browsing session which is used as an example HTTP_Page_Large_Display_Rate in FIG. 6A. As discussed herein, an anomaly in this rate can be correlated to an anomaly in a KPI (Total_DLPS_Traffic_Bits in FIG. 6A) and these used to determine the root cause of this problem in the network.

Figure 7:
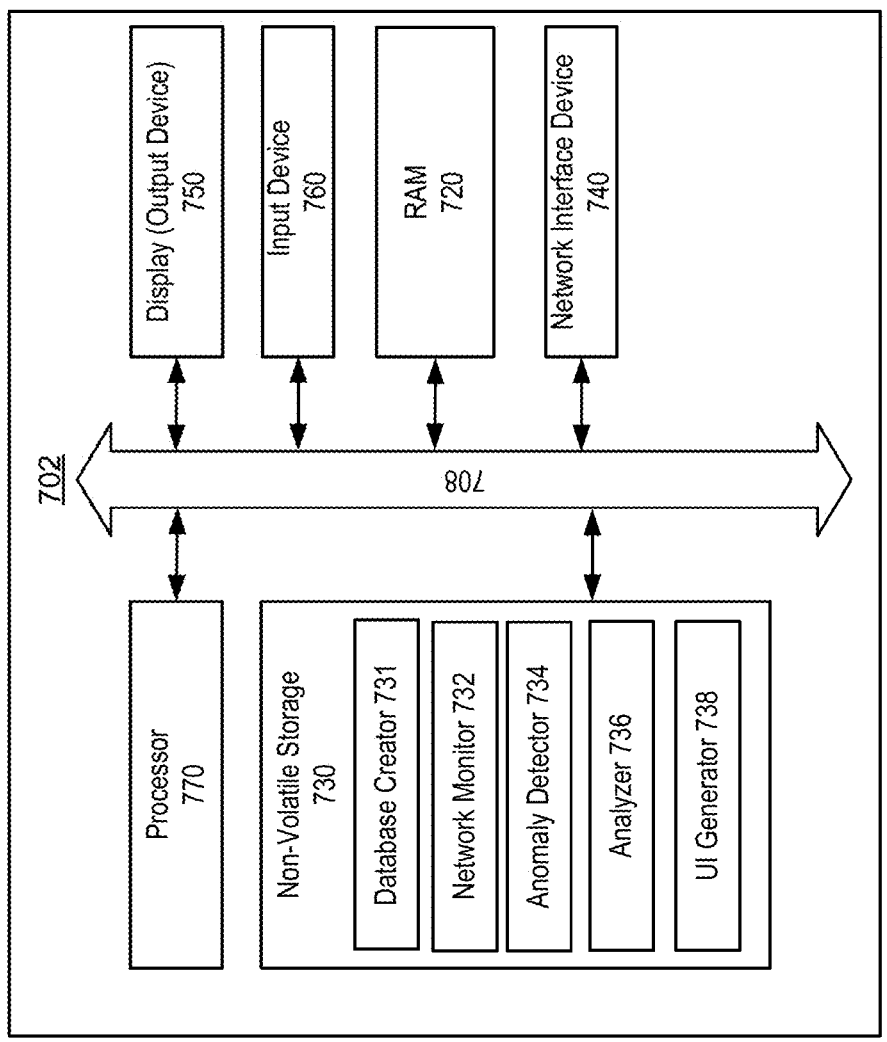
FIG. 7 is a block diagram of a processing device suitable for implementing the system and method.

Returning to FIG. 1, a network monitoring system 150 may include a database processor 152, a fingerprint database 155, a network monitor 160, and anomaly detector 165, an anomaly and root cause analyzer 170 and an output generator 180. A network monitoring system 150 may be implemented in a computer system comprising one or more computing devices of various types. One example of such a computing system is illustrated in FIG. 7. Network monitoring system 150 may be a discrete system, or it may be integrated within other systems including the systems and components within the communication network 100.

Database processor 152 performs association rule learning on historical network data 110 and engineering data 120 to create the fingerprint database 155. The historical network data 110 comprises historical network performance data as characterized by the KPIs and KQIs available for the network and is sequenced in time. The database provides a set of rules reflecting the relationship between KPIs and KQI that influence network performance. A method performed by the database processor is illustrated in FIG. 2. The database processor may be enabled by code operable to instruct a processing device to perform the method of FIG. 2 or by processing specific hardware adapted to implement the learning algorithms discussed herein programmatically. Hence, the creation of the fingerprint database is performed in an automated fashion once access to historical network data 110 and engineering data is provided.

The fingerprint database 155 is utilized by the anomaly detector 165 and analyzer 170 to determine which factors may contribute to network quality issues, and thereby identify possible root causes of network quality issues. A small example of the rules in the fingerprint database is illustrated in the data structure shown in FIG. 4. The creation and use of the fingerprint database 155 is discussed further below. The fingerprint database 155 may be updated periodically as new historical network data 110 or engineering data 120 is provided for the network 100.

The network monitor 160 accesses various components of network 100 to monitor analysis data for defined KPI and KQI data in real time and/or periodically. Anomalies in the data accessed by the network monitor 160 are then analyzed by analyzer 170 when detect by the anomaly detector 165 detects an anomaly. Alternatively, anomaly detector 165 and/or analyzer 170 may periodically analyzed stored data additionally to or instead of analyzing data in real time.

Figures 6A, 6B:
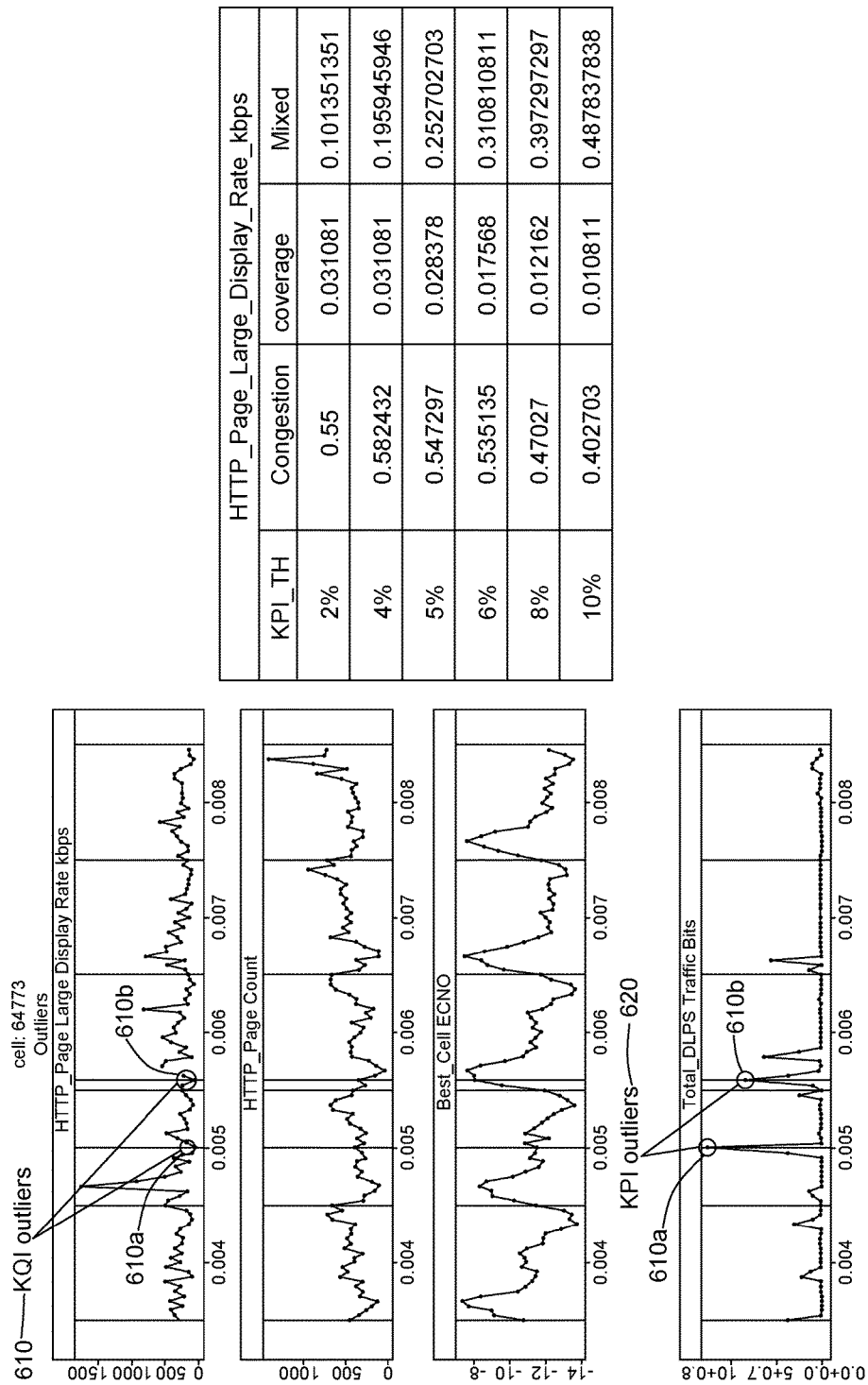
FIG. 6A is an illustration of data from a cell compared with the output of a rule defining a key performance indictor relationship.
FIG. 6B is an exemplary output report for the data illustrated in FIG. 6A.

The anomaly detector 165 compares the historical data for KPIs to detect variations in KPI and KQI analysis data. Each KPI and KQI has a normal range of operational values which can be defined. When a data outlier in KPI or KQI analysis data occurs, an anomaly may be indicated. When a KQI or KPI anomaly is detected, the anomaly detector 165 may further perform a co-occurrence analysis to search for other KPIs and KQIs to determine whether simultaneous or near-simultaneous anomalies in other KPIs and KQIs have also occurred. These detected, co-occurred anomalies are then analyzed by a matching algorithm in the analyzer 170 relative to data retrieved from the fingerprint database 165 to determine likely root causes of the anomalies detected. To detect anomalies in analysis data, for each parameter monitored, a detection cycle is triggered during which a fragment of analysis data is received. Time stamps of the data fragment are recorded. The anomaly detector calculates the variance in any data point according to minimum threshold variations defined for each parameter. Such variations may be determined from historical data for each parameter. The system may include a set of default thresholds for each monitored parameter, with such thresholds being adjustable by an operator of the network monitor 150. A sample data fragment is illustrated in FIG. 6A.

The analyzer 170 performs a matching analysis as described below. In the matching analysis, anomalies in the KPI and KQI data analysis data which are co-occurring in time are matched to learned rules in the fingerprint database to identify potential root causes of network issues. The matching between the KPI data, KQI data and the fingerprint database may in one embodiment be performed by comparing the identified abnormal patterns with rules derived from records in the historic knowledge database under a given similarity measure. One example is the k-nearest neighbors (KNN) algorithm.

FIG. 2 is a flowchart illustrating a method for creating a fingerprint database 155. At step 210, historical KPI data and quantifiable KQI data, if available, is accessed. At step 220, engineering knowledge is accessed. Engineering knowledge can comprise rules defined by one or more network engineers based on network knowledge which define the relationships between performance indicators and quality indicators. In one embodiment, step 210 is skipped, and the fingerprint database is created solely from engineering data knowledge. In one embodiment, step 220 is skipped and the fingerprint database is created solely from historical data. In a further embodiment, both engineering knowledge at 220 and historical data at 210 are utilized to create the fingerprint database.

At 230, historical data and/or engineering knowledge is analyzed using association rule learning to create a database of regularly occurring associations in the data. For example, a regularly occurring spike in DLPS Traffic Bits (a KPI) may correlate with drops in Large Page Display Rate Throughput (a KQI). This association is seen in the exemplary data shown in FIG. 6A below.

Figures 4, 5:
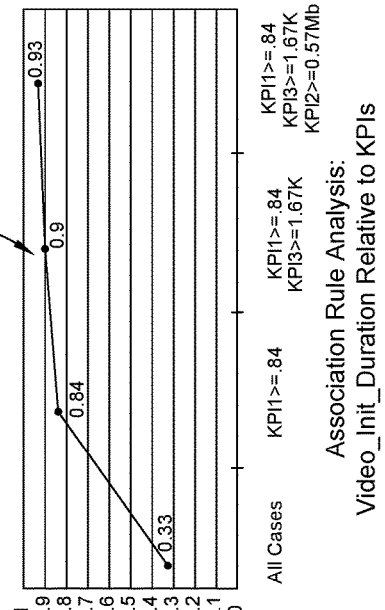
FIG. 4 is a table illustrating a series of rules stored in the fingerprint database in accordance with the system and method.
FIG. 5 is a graph illustrating the effectiveness of matching one or more performance indicators to a rule.

Association rule learning is a method for discovering interesting relations between variables in large databases. An association rule is expressed as "If x is occurs, then y occurs." Every rule is composed of two different sets of items X and Y, where X is the antecedent or left hand side (LHS) and Y is the consequence or right hand side (RHS). In the present system and method, X defines the set of items of KPI for which a consequence or KQI occurs. For example, the rule {"Diaper, Milk"}⇒Beer found in the sales data of a supermarket would indicate the likelihood that if a customer buys diaper and milk together, they are likely to also buy beer. In the context of a cellular network, the association between performance indicators of a MeanTotalTCPUtilityRatio, TotalDLPSTrafficBits, and VS_RL-C_AM_Disc_HSDPATrfPDU.packet (discarded traffic data in HSDPA RLC layer packets) may be associated with an occurrence of slow video initialization as illustrated in the rules of FIG. 4.

In order to select interesting rules from the set of all possible rules, constraints on various measures of significance and interest may be used. The best-known constraints are minimum thresholds on support and confidence.

Let X be an item-set, X⇒Y an association rule and T a set of transactions of a given database. The support value of X (supp(X)) with respect to T is defined as the proportion of transactions in the database which contains the item-set X. Expressed as a formula: supp(X) is the joint probability of finding both X and Y together in a random basket. For example, if an item-set (diaper, milk beer) occurs in 1 out of 5 transactions, it has a support of 0.2 since it occurs in 20% of all transactions. The argument of supp ( ) is a set of preconditions, and thus becomes more restrictive as it grows.

The confidence value of a rule, X⇒Y, with respect to a set of transactions T, is the proportion the transactions that contains X which also contains Y, in other words, the probability of finding Y in a basket if the basket already contains X.

Confidence is defined as:

$$conf(v)=supp(X \cup Y)/supp(X).$$

where supp(X ∪ Y) means the support of the union of the items in X and Y. Thus confidence can be interpreted as an estimate of the conditional probability—the probability of finding the RHS of the rule in transactions under the condition that these transactions also contain the LHS.

The Lift of a rule is defined as:

$$\text{lift}(X \Rightarrow Y) = \frac{supp(X \cup Y)}{supp(X) \times supp(Y)}$$

or the ratio of the observed support to that expected if X and Y were independent.

Lift is a measure of the performance of a targeting model (association rule) at predicting or classifying cases as having an enhanced response (with respect to the population as a whole), measured against a random choice targeting model. A targeting model is doing a good job if the response within the target is much better than the average for the population as a whole. Lift is simply the ratio of these values: target response divided by average response. Hence:

$$\text{Lift }(KPI \text{ deteriorates} \Rightarrow KQI \text{ deteriorates}) = \frac{P(KPI \cap KQI)}{P(KPI)P(KQI)}$$

High lift therefore implies a strong association between two items. Generally, association rules may be analyzed to satisfy a user-specified minimum support and a user-specified minimum confidence at the same time. A minimum support threshold is applied to find all frequent item-sets in a database. A minimum confidence constraint is applied to these frequent item-sets in order to form rules.

In the present system, a lift of 1.5 is set as a threshold. All rules calculated to have a lift of less than 1.5 are discarded. In another embodiment, a higher or lower threshold may be set. A minimum lift is 1.0.

In one embodiment, association rule learning is performed by calculation relations using any one of an Apriori, ELAT or FP-Growth Algorithm. For example, an Apriori algorithm is designed to operate on databases containing transactions (for example, collections of items bought by customers, or details of a website frequentation) where each transaction is seen as a set of items (an itemset). Given a threshold C, the Apriori algorithm identifies the item sets which are subsets of at least C transactions in the database. Frequent subsets are extended one item at a time (candidate generation), and groups of candidates are tested against the data. The algorithm terminates when no further successful extensions are found.

Apriori uses breadth-first search and a Hash tree structure to count candidate item sets efficiently. It generates candidate item sets of length k from item sets of length k−1. Then it prunes the candidates which have an infrequent sub pattern. The algorithm terminates when frequent itemsets cannot be extended any more. But it has to generate a large amount of candidate itemsets and scans the data set as many times as the length of the longest frequent itemsets. Apriori algorithm can be written by pseudocode as follows:

```
Input: data set D, minimum support minsup
Output: frequent itemsets L
(1)  L₁ = find_frequent_1_itemsets (D);
(2)  for (k = 2; Lk 1 − ≠ φ ; k++)
(3)  {
(4)      Ck = Apriori_gen( Lₖ −1 , minsup);
(5)      for each transactions t ∈ D
(6)      {
(7)          Ct = subset( Ck , t);
(8)          for each candidate c ∈ Ct
(9)              c.count++;
(10)     }
(11)     Lk = {c _Ck | c.count > minsup};
(12) }
(13) return L = { L1 _L2 _... _ Ln };
```

In the above pseudocode, Ck means k-th candidate itemsets and Lk means k-th frequent itemsets.

Alternatively a Frequent Pattern (FP) algorithm may be used to determine rules. In the first pass, the algorithm counts occurrence of items (attribute-value pairs) in the dataset, and stores them to 'header table'. In the second pass, it builds the FP-tree structure by inserting instances. Items in each instance have to be sorted by descending order of their frequency in the dataset, so that the tree can be processed quickly. Items in each instance that do not meet minimum coverage threshold are discarded. If many instances share most frequent items, FP-tree provides high compression close to tree root.

Recursive processing of this compressed version of main dataset grows large item sets directly, instead of generating candidate items and testing them against the entire database. Growth starts from the bottom of the header table (having longest branches), by finding all instances matching given condition. A new tree is created, with counts projected from the original tree corresponding to the set of instances that are conditional on the attribute, with each node getting sum of its children counts. Recursive growth ends when no individual items conditional on the attribute meet minimum support threshold, and processing continues on the remaining header items of the original FP-tree. Once the recursive process has completed, all large item sets with minimum coverage have been found, and association rule creation begins.

Still further, step 220 may be performed using an Equivalence Class Transformation (ECLAT) algorithm. The ECLAT algorithm uses tidset intersections to compute the support of a candidate itemset avoiding the generation of subsets that does not exist in the prefix tree. The ECLAT algorithm is defined recursively. The initial call uses all the single items with their tidsets. In each recursive call, the function IntersectTidsets verifies each itemset-tidset pair (X, t(X)) with all the others pairs (Y, t(Y)) to generate new candidates $N_{xy}$. If the new candidate is frequent, it is added to the set $P_x$. Then, recursively, it finds all the frequent itemsets in the X branch. The algorithm searches in a depth-first search manner to find all the frequent sets.

Hence, the fingerprint database is built programmatically using any of the aforementioned methods or their variations by the database processor 152.

FIG. 4 is a table illustrating a portion of a data structure series of five rules stored in the fingerprint database. A first or LHS column illustrates a set of KPI which may be present in analyzed data, while the RHS column illustrates the result (effect) of that set of items in the LHS of the associative rule likely present affecting the factor in the RHS column. Support, confidence and Lift values for each of the 5 rules illustrated are also shown. Each of the rules is defined for a video initiation duration factor (Video_Init_Duration). The exemplary table was generated as a portion of rules from historical data on a 200 cell network.

In Row 1 of the table, three performance indicators are shown—MeanTotalTCPUtilityRatio, TotalDLPSTrafficBits, and VS_RLC_AM_Disc_HSDPATrfPDU.packet. Rule 1 has the highest lift of the rules listed in the table. In Row 2 of the table, a second rule defines MeanTotalTCPUtilityRatio, VS_RLC_AM_Disc_HSDPATrfPDU.packet and VS_HSDPA_MeanChThrougput_TotalBytes.byte as affecting Video_Init_Duration. Although having lower support than rules 3-5, rule 2 has greater lift.

In the example of FIG. 4, when exemplary values of the three KPIs measured are, for example, MeanTotalTcpUtilityRatio (KPI1)>=0.84, TotalDLPSTrafficBits (KPI2)>=0.57 Mb and RLC_AM_Disc_HsdpaTrfPDU.packet (KPI3)>=1.7 k, then Video_Init_Duration is High(>4.91 s).

FIG. 5 is a graph 502 illustrating the effectiveness of matching one or more performance indicators to a rule. As illustrated in FIG. 5 the graph 502 shows how the combined factors on the left hand side (LHS) of a rule increase the accuracy of illustrating the effect on the KQI factor on the right hand side (RHS). In FIG. 5, graph 502 illustrates the respective effectiveness of combining KPI factors versus the accuracy of evaluating all factors, one factor alone, two factors and three factors. The relative distribution of all cases of Video_Init_Duration is 0.33, while combining two factor (MeanTotalTCPUtilityRatio=0.84 and RLC_AM_Disc_HsdpaTrfPDU.packet=1.67K) increases the likelihood that Video_init_Duration will be affected to 0.9, and adding TotalDLPSTrafficBits=0.57 mb increases the likelihood to 0.93.

Hence, if a matching determines all three KPI anomalies are satisfied, then there is a 93 percent chance that the video initiation duration is bad. In one embodiment, a selection of three factors is analyzed. In other embodiments, more or fewer factors may be utilized in each rule.

Returning to FIG. 2, once association rules have been computed, the rules determined by step 220 are stored in the fingerprint database 155 at step 240.

FIG. 3 is a flowchart illustrating a method for analyzing a network utilizing the fingerprint database. The method of FIG. 3 may be performed in real time or periodically as a method of monitoring analysis data from a network.

At 310, KPI and KQI analysis data is accessed. The analysis data may include the same, more or fewer performance indicators than the historical data 120. In one embodiment, the analysis data may be accessed in real time by the network monitor. Alternatively or in addition, KPI and KQI data may be accessed and analyzed periodically at 310.

At 320, for each KPI and each KQI, the analysis data is monitored for anomalies. Examples of a KQI anomaly and a KPI anomaly are illustrated at 610 and 620 in FIG. 6A. Monitoring may be performed by receiving analysis network data via the network interface of FIG. 1.

As noted, an anomaly is detected at 320 when a data point in the analysis data varies in excess of a minimum threshold variation defined for each parameter. The system may include a set of default thresholds for each monitored parameter, with such thresholds being adjustable by an operator of the network monitor 150. In the example of FIG. 6A, two anomalies (data outliers) are illustrated for each of HTTP_PageLargeDisplayRate KQI and a TotalDLPSTrafficBits KPI.

Once a data anomaly is detected, a co-occurrence analysis on the analysis data is performed at 330. Step 330 determines simultaneous or near simultaneous occurrences between anomalies in the analysis data. In the example of FIG. 6A, a determination has been made that the KQI and KPI outliers occurred at two different simultaneous time periods. The anomalies are data points for any parameter having a greater than threshold deviation from an average data values for the parameter. Note that the two anomalies for the KQI HTTP_PageLargeDisplayRate correspond simultaneously in time with the two anomalies for TotalDLPSTrafficBits.

Once all simultaneous or near simultaneous anomalies have been detected within a given time frame, fingerprint matching against the rules in the database is performed to determine which indicators will affect create a network problem at 340. In one embodiment, the analyzer 170 performs step 340 using a matching by a k-nearest neighbor (KNN) algorithm.

The KNN algorithm stores all available cases and classifies new cases based on a similarity measure (e.g., distance functions). A case is classified by a majority vote of its neighbors, with the case being assigned to the class most common amongst its K nearest neighbors measured by a distance function. If K=1, then the case is simply assigned to the class of its nearest neighbor using a distance measure, such Euclidean or Hamming distance. In the case of similarity classification, the most prevalent rule or a ranked number of rules (causes) may be returned.

Finally, an output is generated at 350. The output may take many forms or reporting or user interfaces designed to provide a network engineer with an indication of a root cause of the anomaly. One example of an output is shown in FIG. 6B, though many numerous alternatives for output reports are contemplated.

FIG. 6B is an illustration of data from a cell compared with the output of a rule defining a key performance indictor relationship. Four data sources (two KQI and two KPI) are illustrated in the left hand side of FIG. 6. The chart on the left shows two outliers in the HTTP_PageLargeDisplayRate KQI and a Total DLPS Traffic Bit KPI. To understand the cause of the KQI and KPI outliers, using the fingerprint database, we know that the KQI will degrade with a fair amount of certainty when the KPI outliers are found.

FIG. 6B illustrates one possible output interface generated a step 350. In order to generate an output that is usable for a user, root causes can be grouped into different categories. Examples of categories of root causes include, as high traffic load, poor RF coverage, and hardware failure.

In the report generated and output at FIG. 6B, in one application, the root causes may be classified as congestion—too many users or an inadequate capacity for a given cell in a network and a coverage issues—inadequate signal strength or reach. An output may be generated characterizing the relationship of the key performance indictor to categories of root causes, as in FIG. 6B. In FIG. 6B, the threshold change of the performance indicator is provided in the first column, and the contribution of each root cause for the cell data listed in FIG. 6B is listed in terms of congestion, coverage and both causes (mixed). In FIG. 6B, a threshold for degradation in any one or more KPIs may be set and the output shown in FIG. 6B provides, for each percentage, the amount of degradation in congestion and how much there would be in coverage, and how much the factors are mixed.

It will be recognized that numerous alternative forms of output may be provided. In one alternative, a user interface may provide an alert of one or more quality or performance indicators experiencing an anomaly, with the interface providing a facility to provide further information on the root cause (or potential root causes ordered confidence or lift).

In the case of the mobile network, engineering knowledge stored in database 120 as engineering data may be utilized to classify root causes. For example, engineering data may be a known characterization of a network problem based on human knowledge of the construction of the network or previous events. Engineering knowledge of a particular cell's capacity may be linked in a rule associating a detected problem in traffic congestion related to that cell. Where a performance counter in analysis data returns an anomaly for a particular cell, engineering data for that cell may reflect an associated rule indicating a limited capacity for that cell as a potential root cause of the anomaly. Based on engineering knowledge, it categories of root causes can be classified into workable identifications for network engineers. This classification makes reporting of root causes more efficient.

FIG. 7 is a block diagram of a processing device suitable for implementing the system and method. The computing system 702 may include, for example, a processor 710, random access memory (RAM) 720, non-volatile storage 730, a display unit (output device) 750, an input device 760, and a network interface device 740. In certain embodiments, the computing system 702 may be embedded into a personal computer, mobile computer, mobile phone, tablet, or other suitable processing device.

Illustrated in non-volatile storage 730 are functional components which may be implemented by instructions operable to cause processor 710 to implement one or more of the processes described below. While illustrated as part of non-volatile storage 730, such instructions may be operate to cause the processor to perform various processes described herein using any one or more of the hardware components illustrated in FIG. 7. These functional components include a virtual machine manager and a VNF.

Non-volatile storage 730 may comprise any combination of one or more computer readable media. The computer readable media may be a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a computer diskette, a hard disk, a random access memory (RAM), a read-only memory (ROM), an erasable programmable read-only memory (EPROM or Flash memory), an appropriate optical fiber with a repeater, a compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The computer system 702 can include a set of instructions that can be executed to cause computer system 702 to perform any one or more of the methods or computer based functions disclosed herein. Computer program code for carrying out operations for aspects of the present disclosure may be written in any combination of one or more programming languages, including an object oriented programming language conventional procedural programming languages. The program code may execute entirely on the computer system 702, partly on the computer system 702, as a stand-alone software package, partly on the computer system 702 and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service.

As illustrated in FIG. 7, the computing system 702 includes a processor 710. A processor 710 for computing system 702 is configured to execute software instructions in order to perform functions as described in the various embodiments herein. A processor 710 for a computing system 702 may be a general purpose processor or may be part of an application specific integrated circuit (ASIC). A processor 710 for a computing system 702 may also be a microprocessor, a microcomputer, a processor chip, a controller, a microcontroller, a digital signal processor (DSP), a state machine, or a programmable logic device. A processor 710 for a computing system 702 may also be a logical circuit, including a programmable gate array (PGA) such as a field programmable gate array (FPGA), or another type of circuit that includes discrete gate and/or transistor logic. A processor 710 for a computing system 702 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computing system 702 includes a RAM 720 and a non-volatile storage 730 that can communicate with each, and processor 710, other via a bus 708. Illustrated in the non-volatile storage 730 are components a network monitor 732 which may be utilized by the processor to create the network monitor 160 of FIG. 1, a database creator 731 which may be utilized to create the fingerprint database 155, an anomaly detector 734 which may be utilized by the processor to create the anomaly detector 165 of FIG. 1, analyzer 736 which is utilized create an anomaly detector 165 to detect data anomalies and co-occurrence analysis, and a virtual user interface generator 738 any of the output reports discussed herein. Each of the components may comprise instructions capable of causing the processor 770 to execute steps to perform the methods discussed herein.

As shown, the computing system 702 may further include a display unit (output device) 750, such as a liquid crystal display (LCD), an organic light emitting diode (OLED), a flat panel display, a solid state display, or a cathode ray tube (CRT). Additionally, the imaging processor may include an input device 760, such as a keyboard/virtual keyboard or touch-sensitive input screen or speech input with speech recognition, and which may include a cursor control device, such as a mouse or touch-sensitive input screen or pad.

Memories described herein are tangible storage mediums that can store data and executable instructions, and are non-transitory during the time instructions are stored therein. A memory described herein is an article of manufacture and/or machine component. Memories will described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. Such computer readable media specifically excludes signals. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The subject matter herein advantageously provides a processor implemented method of identifying a root cause of degraded network quality in a wireless network. The method accesses historical network performance data comprising a time sequenced measure of performance indicators for the network. The historical data is evaluated using machine implemented association learning to determine regularly occurring associations between indicators and thereby define a set of rules characterizing the associations of the wireless network. The rules are stored as a set of rules in a data structure. After evaluation of the historical data, the method monitors the wireless network by accessing analysis data reporting time sequenced performance indicator data. Anomalies in monitored performance indicators are then detected in the analysis data, and matched to at least one rule in the set of rules. An output of an indication of a root cause of degradation in the wireless network resulting from the anomaly in the performance indicator.

The method disclosed herein thus provides a relatively low complexity and automated method for determining root causes in a wireless network. The system and method can be extended to any network or system wherein quantifiable key performance indicators and key quality indicators are formed. The system and method is capable of adaptively learning rules based on both historical data and engineering information, and therefore may learn new associations as time goes on and the fingerprint database is updated.

In accordance with the above advantages, system and method includes a database processor (152) for computing a set of rules using the processor, the rules identifying associations between performance indicators of the cellular network based on one or both of engineering knowledge and historical network data, the associations including a set of indicators having an effect on at least one other indicator of the cellular network, and store the set of rules in the storage; a network monitor (160) for monitoring the cellular network by accessing time sequenced analysis data of network performance indicators via the network interface; an anomaly detector (165) for detecting an anomaly in at least one performance indicator in the analysis data received via the network interface, and detect other anomalies co-occurring in time with said anomaly; an analyzer (170) for matching the anomaly and anomalies co-occurring in time to at least one rule in the set of rules; and a output (180) for outputting an indication of a cause of degradation in the cellular network resulting from the anomaly in the performance indicator.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A processor implemented method of identifying root causes of degraded network quality in a wireless network, comprising:
   accessing historical wireless network performance data, the performance data comprising a time sequenced measure of performance indicators comprising key performance indicators (KPIs) and key quality indicators (KQIs) for the network;
   computing a plurality of rules based on associations between the performance indicators which co-occur in the historical wireless network performance data using an associative learning algorithm, each rule in the plurality matching a set of multiple co-occurring anomalies in the performance indicators to a root cause of performance degradation in the network;
   storing the plurality of rules in a data structure;
   subsequent to said computing, monitoring the wireless network by accessing analysis data reporting time sequenced performance indicators, including the KPIs and the KQIs;
   detecting an anomaly in at least one of the performance indicators in the analysis data;
   computing occurrences of anomalies in other performance indicators in the analysis data occurring near simultaneously in time to the anomaly in the at least one performance indicator;
   matching the anomaly in the at least one of the performance indicators and the anomalies in the other performance indicators to at least one rule in the plurality of rules to match the anomaly in the at least one of the performance indicators and the anomalies in the other performance indicators to the root cause defined by the rule;
   outputting an indication of the root cause resulting from the anomaly in the at least one of the performance indicators and the anomalies in the other performance indicators, and
   adjusting an element of the network to address the root cause identified by the outputting.

2. The processor implemented method of claim 1 wherein each rule defines at least three co-occurring anomalies associated with the root cause.

3. The method of claim 1 wherein the step of matching the anomaly to at least one rule includes accessing the data structure and determining a similarity between the anomaly, any co-occurring anomalies, and a rule in the data structure using a k-nearest neighbor algorithm.

4. The method of claim 1 wherein the outputting comprises listing on an interface, for a performance indicator, a plurality of thresholds defining an anomaly, and for each threshold, one or more classified root causes and an indication of an amount of affect each of the one or more classified root causes has on the network.

5. The method of claim 1 wherein the historical data and the analysis data each include a set of quantified key quality indicators and key performance indicators.

6. A non-transitory computer-readable medium storing computer instructions, that when executed by one or more processors, cause the one or more processors to perform the steps of:
   computing a plurality of rules based on associations between performance indicators of elements of a wireless network which co-occur in engineering data and historical network data using processor implemented association learning, the associations comprising a set of multiple performance indicators which, when co-occurring anomalies occur in the set, have an effect on at least one root cause degradation in the wireless network, the performance indicators comprising key performance indicators (KPIs) and key quality indicators (KQIs);

monitoring the wireless network by accessing analysis data reporting time sequenced performance indicators including the KPIs and the KQIs;

detecting an anomaly in at least one performance indicator in the analysis data;

detecting co-occurring anomalies of other performance indicators in the analysis data occurring near simultaneously in time to said anomaly in the at least one performance indicator;

matching the anomaly in the at least one performance indicator and co-occurring anomalies in the other performance indicators detected to at least one rule in the plurality of rules to match the anomaly in the at least one performance indicator and the co-occurring in the other performance indicators to the root cause defined by the rule; and adjusting an element of the network associated with one or more of the co-occurring to address the root cause.

7. The non-transitory computer-readable medium of claim 6 wherein the computer instructions for performing the steps of computing a plurality of rules comprises computer instructions to execute one of an apriori algorithm, a FN-algorithm or an ECLAT algorithm on the historical network data, and ranking an output of rules by a computed lift value.

8. The non-transitory computer-readable medium of claim 7 wherein the computer instructions for performing the steps of computing a plurality of rules comprises instructions to store the plurality of rules in a data structure, and wherein the computer instructions for matching the anomaly in the at least one performance indicator and the co-occurring anomalies in the other performance indicators includes computer instructions to access the data structure and code configured to detect a similarity between a set including the anomaly in the at least one performance indicator and the co-occurring in the other performance indicators with a rule in the data structure.

9. The non-transitory computer-readable medium of claim 8 wherein the computer instructions include computer instructions for listing on an interface, for a performance indicator, a plurality of thresholds defining an anomaly, and for each threshold, of one or more classified root cause and an indication of an amount of affect each of the one or more classified root causes has on the network.

10. The non-transitory computer-readable medium of claim 6 wherein the computer instructions for computing a plurality of rules characterizing associations between performance indicators of elements of the wireless network comprises computer instructions for comparing the historical data and the analysis data, wherein each includes a set of quantified key quality indicators and key performance indicators.

11. A mobile network monitoring system for a cellular network, comprising: a processing system including at least one processor, storage coupled to the processor, and a network interface; instructions stored on the storage operable to instruct the at least one processor to:

access historical network performance data, the performance data comprising a time sequenced measure of performance indicators comprising key performance indicators (KPIs) and key quality indicators (KOIs) for the cellular network;

compute a plurality of rules based on associations between ones of the performance indicators using processor implemented association learning, each rule based on one or both of engineering knowledge data and the historical performance data, each rule matching a set of multiple co-occurring anomalies in the performance indicators to a root cause of performance degradation in the cellular network, and store the plurality of rules in the storage;

monitor the cellular network by accessing time sequenced analysis data of the performance indicators via the network interface;

detect an anomaly in at least one performance indicator in the analysis data received via the network interface;

computing occurrences of anomalies in other performance indicators in the analysis data occurring near simultaneously in time to the anomaly in the at least one performance indicator;

match the anomaly in the at least one performance indicator and the in the other performance indicators co-occurring in time to at least one rule in plurality of rules to match the anomaly in the at least one performance indicator and the anomalies in the other performance indicators to the root cause defined by the rule; and adjusting an element of the network to address the root cause identified by the outputting.

12. The mobile network monitoring system of claim 11 wherein the instructions configured to compute a plurality of rules is configured to cause the processor to execute one of an apriori algorithm, a FN-algorithm or an ECLAT algorithm on the one or both of engineering knowledge and historical network data, and rank the rules by a computed lift value.

13. The mobile network monitoring system of claim 11 wherein instructions to compute a set of rules further includes instructions to store the plurality of rules in a data structure, and wherein the instructions to match the anomaly and co-occurring anomalies includes instructions to access the data structure and instructions to detect a similarity between a set including the anomaly and the co-occurring anomalies with a rule in the data structure.

14. The mobile network monitoring system of claim 11 further including providing an output listing on an interface, for a performance indictor, a plurality of thresholds defining an anomaly, and for each threshold, multiple root causes and an indication of an amount of affect each of multiple root causes has on the network.

15. The mobile network monitoring system of claim 11 wherein the analysis data is monitored in real time.

16. The mobile network monitoring system of claim 11 wherein the analysis data is accessed periodically.

17. The method of claim 2 wherein the computing comprises applying one of an apriori algorithm, a FN-algorithm or an ECLAT algorithm and ranking an output of the matching by lift.

* * * * *